(12) United States Patent
Lee et al.

(10) Patent No.: US 9,376,514 B2
(45) Date of Patent: Jun. 28, 2016

(54) VINYL CHLORIDE LATEX WITH LOW ENERGY CONSUMPTION AND METHOD FOR PREPARING THE SAME

(71) Applicant: LG CHEM, LTD., Seoul (KR)

(72) Inventors: Hyun Sup Lee, Daejeon (KR); Woo Sung Hwang, Daejeon (KR); Han Hong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 79 days.

(21) Appl. No.: 14/356,507

(22) PCT Filed: Sep. 16, 2013

(86) PCT No.: PCT/KR2013/008379
§ 371 (c)(1),
(2) Date: May 6, 2014

(87) PCT Pub. No.: WO2014/046445
PCT Pub. Date: Mar. 27, 2014

(65) Prior Publication Data
US 2014/0316095 A1  Oct. 23, 2014

(30) Foreign Application Priority Data

Sep. 20, 2012 (KR) .......... 10-2012-0104321
Sep. 16, 2013 (KR) .......... 10-2013-0110866

(51) Int. Cl.
*C08F 114/06* (2006.01)
*C08F 14/20* (2006.01)

(52) U.S. Cl.
CPC .............. *C08F 114/06* (2013.01); *C08F 14/20* (2013.01)

(58) Field of Classification Search
CPC .............................. C08F 114/06; C08F 14/20
USPC .......................... 524/344; 526/344.2, 81, 345
See application file for complete search history.

(56) References Cited

U.S. PATENT DOCUMENTS

| | | | |
|---|---|---|---|
| 4,340,722 A | 7/1982 | Arnal et al. | |
| 7,534,855 B2 * | 5/2009 | Baek | C08F 6/18 524/569 |

FOREIGN PATENT DOCUMENTS

| | | |
|---|---|---|
| CN | 101300277 A | 11/2008 |
| CN | 101506249 A | 8/2009 |
| CN | 102652144 A | 8/2012 |
| JP | 5676413 A | 6/1981 |
| JP | 56157444 A | 12/1981 |
| JP | 2000-204211 A | 7/2000 |
| JP | 2000204211 A * | 7/2000 |
| JP | 2000281716 A | 10/2000 |
| JP | 2000281717 A | 10/2000 |
| JP | 2002-348313 A | 12/2002 |
| KR | 10-1983-0004344 A | 7/1983 |
| KR | 10-2012-0073672 A | 7/2012 |
| KR | 10-2013-0090730 A | 8/2013 |

* cited by examiner

Primary Examiner — Kelechi Egwim
(74) Attorney, Agent, or Firm — Dentons US LLP

(57) ABSTRACT

Disclosed is a polyvinyl chloride resin latex which is prepared by polymerization using a decreased amount of polymerization water in an early polymerization stage and then additional polymerization water in a late polymerization stage, so that the polyvinyl chloride resin latex has an increased solid content and a decreased water content and thus finally remarkably reduces energy consumption in a spray drying process.

4 Claims, No Drawings

VINYL CHLORIDE LATEX WITH LOW ENERGY CONSUMPTION AND METHOD FOR PREPARING THE SAME

This application is a National Stage Application of International Application No. PCT/KR2013/008379, filed Sep. 16, 2013, and claims priority to and the benefit of Korean Patent Application No. 10-2012-0104321, filed on Sep. 20, 2012, and Korean Patent Application No. 10-2013-0110866, filed on Sep. 16, 2013, the disclosures of which are incorporated herein by reference in their entirety.

TECHNICAL FIELD

The present invention relates to a vinyl chloride resin latex. More particularly, the present invention relates to a polyvinyl chloride resin latex which is prepared by polymerization using a decreased amount of polymerization water in an early polymerization stage and then additional polymerization water in a late polymerization stage, so that the polyvinyl chloride resin latex has an increased solid content and a decreased water content and thus finally remarkably reduces energy consumption in a spray drying process.

BACKGROUND ART

A paste vinyl chloride resin is prepared by adding a vinyl chloride monomer alone or a mixture of the vinyl chloride monomer and a monomer which is co-polymerizable therewith (these are broadly referred to as "vinyl chloride monomer"), an emulsifier and a fat-soluble polymerization initiator to an aqueous medium, followed by homogenization and micro-suspension polymerization. If necessary, an auxiliary dispersant such as higher alcohol or higher fatty acid may be used.

Alternatively, the paste vinyl chloride resin is prepared by adding a vinyl chloride monomer, an emulsifier and a water-soluble polymerization initiator to an aqueous medium, followed by performing emulsion polymerization or seed emulsion polymerization.

In accordance with seed emulsion polymerization, when two types of seeds having different mean particle diameters are added in an early polymerization stage, a vinyl chloride monomer is grown while reacting with the seeds to obtain final latex particles.

80 to 98% by weight of the vinyl chloride monomer used for polymerization of a paste vinyl chloride resin is generally converted into the paste vinyl chloride resin and the remaining un-reacted monomer is removed, to obtain a latex. The paste vinyl chloride resin is obtained by spray drying the latex in a spray drier. Steam of a high temperature of 200° C. is required to evaporate 50% by weight or more of water in the latex during drying. An increase in solid content is considerably effective in energy consumption, because a great amount of expensive steam is required to evaporate a great amount of water having a high specific heat. In conventional methods, latex concentration has been used to increase a solid content of latex. Solid content of latex is increased by separating water using a separation membrane. However, this concentration entails high initial investment cost, is difficult to increase a solid content to 3% by weight or higher, has high maintenance costs due to costs required for frequent replacement and cleaning of separation membranes and is considerably ineffective.

DISCLOSURE

Technical Problem

Therefore, the present invention has been made in view of the above problems, and it is an object of the present invention to provide a vinyl chloride latex having a low water content and a method for preparing the same.

The object can be accomplished by the present invention described below.

Technical Solution

In accordance with an aspect of the present invention, the above and other objects can be accomplished by the provision of a vinyl chloride resin latex having a water content of 40 to 48% by weight.

The water may be, for example, remaining polymerization water present immediately after completion of polymerization.

The water content may be, for example, a content of water removed at 150° C. for 30 minutes.

In accordance with another aspect of the present invention, provided is a paste vinyl chloride resin prepared by spray-drying the vinyl chloride resin latex.

In accordance with another aspect of the present invention, provided is a method for preparing a vinyl chloride resin latex including (a) initiating polymerization of 100 parts by weight of a vinyl chloride monomer and 40 to 55 parts by weight of polymerization water, and (b) further adding 5 to 20 parts by weight of polymerization water in a late polymerization stage. In this case, there are advantages in that polymerization is stably performed, generation of heat kick is inhibited, energy consumption is greatly reduced due to shortened high-temperature drying process of latex after completion of polymerization and physical properties are not changed.

The polymerization water of the step (a) may, for example, comprise 40 to 50 parts by weight or 40 to 45 parts by weight. Within this range, there are advantages in that polymerization is stably performed, generation of heat kick is inhibited, energy consumption is greatly reduced due to shortened high-temperature drying process of latex after completion of polymerization and physical properties are not changed.

The polymerization water of the step (b) may, for example, be added in an amount of 5 to 15 parts by weight, or 5 to 10 parts by weight. Within this range, there are advantages in that polymerization is stably performed, generation of heat kick is inhibited, energy consumption is greatly reduced due to shortened high-temperature drying process of latex after completion of polymerization and physical properties are not changed.

The polymerization water of the step (b) may, for example, be added batchwise or continuously, or be added in an amount of 0.1 to 0.5 parts by weight or 0.2 to 0.3 parts by weight, per minute. Within this range, there are advantages in that heating is effectively controlled and polymerization is stably performed.

The late polymerization stage is, for example, a time at which a polymerization conversion ratio reaches 65 to 75%, or 67 to 75%. Within this range, there are advantages in that energy consumption is greatly reduced due to shortened high-temperature drying of latex after completion of polymerization and physical properties are not changed.

A weight ratio of the polymerization water of the step (a) and the polymerization water of the step (b) is for example 3.5:1 to 5:1, 4:1 to 5:1, or 4:1 to 4.5:1. Within this range, there are advantages in that polymerization is stably performed, generation of heat kick is inhibited, energy consumption is greatly reduced due to shortened high-temperature drying process of latex after completion of polymerization and physical properties are not changed.

In the step (b), polymerization may be continued during addition of polymerization water.

The present invention relates to a paste vinyl chloride resin and a method for preparing a polyvinyl chloride latex having a low water content by controlling a ratio and time of polymerization water used for polymerization.

Advantageous Effect

The present invention provides a method for preparing a vinyl chloride latex for paste vinyl chloride resins wherein polymerization is performed by adding a reduced amount of polymerization water in an early polymerization stage and then adding the balance of polymerization water, corresponding to the reduced amount, for a predetermined time in a late polymerization stage. Accordingly, the present invention reduces heat kick by gel effect generated in the late polymerization stage, provides polymerization stability of latex and decreases a water content of latex by 4% or longer. In addition, the present invention reduces an amount of early polymerization water, thereby advantageously improving initial reactivity due to increased concentration of vinyl chloride monomer and auxiliary materials and decreasing an amount of added activator. Finally, the present invention provides remarkably reduced energy consumption during drying using a spray drier.

BEST MODE

The present invention provides a vinyl chloride resin latex having a water content of 40 to 48% by weight.

The vinyl chloride resin latex is used for preparation of a paste vinyl chloride resin using spray drying.

The vinyl chloride resin latex is prepared by (a) adding 40 to 55 parts by weight of polymerization water, based on 100 parts by weight of the total monomer added before initiation of polymerization and (b) then adding 5 to parts by weight of polymerization water, based on 100 parts by weight of the vinyl chloride monomer, in a late polymerization stage. Specifically, the vinyl chloride resin latex is prepared by adding 67 to 92% by weight of polymerization water, based on the total weight of polymerization water used for polymerization, in an early polymerization stage and then adding 8 to 33% by weight of polymerization water, based on the total weight of polymerization water used for polymerization, in a late polymerization stage.

When an excessively small amount of polymerization water is used, reaction control is difficult due to deteriorated heat control and stability of latex is deteriorated, and when an excessively large amount of polymerization water is used, it is difficult to decrease water content. The polymerization water should be added in an amount of 5 parts by weight or higher in the late polymerization stage in order to prevent temperature increase. In addition, when a great amount of polymerization water exceeding 20 parts by weight is used, polymerization may be compulsorily finished due to drop of polymerization temperature.

Hereinafter, the present invention will be described in detail.

A paste vinyl chloride resin is prepared by adding a vinyl chloride monomer alone or a mixture of the vinyl chloride monomer and a monomer which is copolymerizable therewith (these are broadly referred to as "vinyl chloride monomer"), an emulsifier and a fat-soluble polymerization initiator to an aqueous medium, followed by homogenization and micro-suspension polymerization. If necessary, an auxiliary dispersant such as higher alcohol or higher fatty acid may be used.

Alternatively, the paste vinyl chloride resin is prepared by adding a vinyl chloride monomer, an emulsifier and a water-soluble polymerization initiator to an aqueous medium, followed by performing emulsion polymerization or seed emulsion polymerization.

In accordance with seed emulsion polymerization, two types of seeds having different mean particle diameters are added in an early polymerization stage and a vinyl chloride monomer is grown while reacting with the seeds to obtain final latex particles.

A first seed is prepared by homogenizing a vinyl chloride monomer, an emulsifier and a fat-soluble initiator using a rotor-stator type homogenizer pump and has a mean particle diameter of about 0.4 to 1.5 µm, and a second seed is prepared by emulsion polymerization and has a mean particle diameter of about 0.1 to 0.4 µm. In this case, an auxiliary dispersant such as higher alcohol or higher fatty acid may be used.

80 to 98% by weight of the vinyl chloride monomer used for polymerization of the paste vinyl chloride resin is generally converted into the paste vinyl chloride resin and remaining unreacted monomer is removed.

The latex of the paste vinyl chloride resin after polymerization is obtained by spray drying. Raw materials such as emulsifier and remaining activator are still left in the resin latex because dehydration, filtering and the like are not performed during drying.

The present invention is directed to a method for preparing a polyvinyl chloride latex having a low water content to reduce energy consumption in the polymerization of the vinyl chloride latex.

Polymerization is performed by adding a decreased amount of polymerization water in an early polymerization stage and then adding the balance of polymerization water, corresponding to the reduced amount, for a predetermined time in a late polymerization stage. Accordingly, the present invention reduces heat kick by gel effect generated in the late polymerization stage, provides polymerization stability of latex and decreases a water content of latex.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

40 parts by weight of early polymerization water and 100 parts by weight of a vinyl chloride monomer were added to a 500 L high-pressure reactor, a temperature of the reactor was elevated to 57.5° C. and polymerization was performed for one hour. Then, the temperature of the reactor was decreased to 51.5° C., and 10 parts by weight of additional polymerization water was further added thereto when the polymerization temperature was 54.5° C. Then, reaction was finished when reactor pressure reached 3.5 kg/cm³. A vinyl chloride latex thus obtained was dried in a spray drier to obtain a vinyl chloride resin.

Example 2

40 parts by weight of early polymerization water and 100 parts by weight of a vinyl chloride monomer were added to a 500 L high-pressure reactor, a temperature of the reactor was elevated to 54° C. and 10 parts by weight of additional polymerization water was further added thereto during polymerization when the polymerization temperature was 57° C. Then, reaction was finished when reactor pressure reached 3.5 kg/cm³. A vinyl chloride latex thus obtained was dried in a spray drier to obtain a vinyl chloride resin.

Example 3

45 parts by weight of early polymerization water and 100 parts by weight of a vinyl chloride monomer were added to a 500 L high-pressure reactor, a temperature of the reactor was elevated to 55° C. and 10 parts by weight of additional polymerization water was further added thereto during polymerization when the polymerization temperature was 58° C. Then, reaction was finished when reactor pressure reached 3.5 kg/cm³. A vinyl chloride latex thus obtained was dried in a spray drier to obtain a vinyl chloride resin.

Comparative Example 1

65 parts by weight of early polymerization water and 100 parts by weight of a vinyl chloride monomer were added to a 500 L high-pressure reactor, a temperature of the reactor was elevated to 57.5° C. and polymerization was performed for one hour. Then, the temperature of the reactor was decreased to 51.5° C. and polymerization was performed. Then, reaction was finished when reactor pressure reached 3.5 kg/cm³. A vinyl chloride latex thus obtained was dried in a spray drier to obtain a vinyl chloride resin.

Comparative Example 2

72 parts by weight of early polymerization water and 100 parts by weight of a vinyl chloride monomer were added to a 500 L high-pressure reactor, a temperature of the reactor was elevated to 54° C. and polymerization was performed. Then, reaction was finished when reactor pressure reached 3.5 kg/cm³. A vinyl chloride latex thus obtained was dried in a spray drier to obtain a vinyl chloride resin.

Comparative Example 3

73.5 parts by weight of early polymerization water and 100 parts by weight of a vinyl chloride monomer were added to a 500 L high-pressure reactor, a temperature of the reactor was elevated to 55° C. and polymerization was performed. Then, reaction was finished when reactor pressure reached 3.5 kg/cm³. A vinyl chloride latex thus obtained was dried in a spray drier to obtain a vinyl chloride resin.

Comparative Example 4

50 parts by weight of early polymerization water and 100 parts by weight of a vinyl chloride monomer were added to a 500 L high-pressure reactor, a temperature of the reactor was elevated to 57.5° C. and polymerization was performed for one hour. Then, the temperature of the reactor was decreased to 51.5° C. and polymerization was continued. Then, reaction was finished when reactor pressure reached 3.5 kg/cm³. A vinyl chloride latex thus obtained was dried in a spray drier to obtain a vinyl chloride resin.

Test Example

Physical properties of polyvinyl chloride latexes of Examples and Comparative Examples were measured and are shown in the following Tables 1 and 2. The measurement was performed using the following method.

1) Water Content

Water content was calculated by subtracting solid content from 100 after weight variation in remaining solid left after heating in an oven at 150° C. for 30 minutes was measured.

2) Latex Stability 20 ml of ethylene dichloride (EDC) was added to 220 g of latex, the mixture was stirred at 1,000 rpm in a stirrer and a time for which a latex was aggregated was measured. Latex stability was determined to be excellent when polymerization was stably performed.

TABLE 1

Polymerization formulation and results

| | Example 1 | Example 2 | Example 3 | Comparative Example 1 | Comparative Example 2 | Comparative Example 3 |
|---|---|---|---|---|---|---|
| Early polymerization water | 40 | 43 | 45 | 65 | 72 | 73.5 |
| Late polymerization water | 10 | 10 | 10 | 0 | 0 | 0 |
| Total polymerization water | 50 | 53 | 55 | 65 | 72 | 73.5 |
| Polymerization temperature (° C.) | 57.5→51.5 | 54 | 55 | 57.5→51.5 | 54 | 55 |
| Amount of added AA* (kg) | 8.09 | 6.34 | 5.57 | 9.07 | 7.67 | 6.83 |
| Water content (%) | 44.74 | 44.38 | 47.95 | 49.13 | 51.0 | 52.16 |
| Latex stability (sec) | 66 | 87 | 110 | 70 | 79 | 108 |

(Unit: parts by weight)

TABLE 2

Polymerization formulation and results

| (Unit: parts by weight) | Comparative Example 4 |
|---|---|
| Early polymerization water | 50 |
| Late polymerization water | 0 |

TABLE 2-continued

| Polymerization formulation and results | |
|---|---|
| (Unit: parts by weight) | Comparative Example 4 |
| Total polymerization water | 50 |
| Polymerization temperature (° C.) | 57.5->51.5 |
| Amount of added AA* (kg) | 8.23 |
| Water content (%) | — |
| Latex stability (sec) | Measurement impossible |

*AA: Ascorbic acid

Vinyl chloride resin latexes of Examples 1 to 3 decreased total polymerization water and decreased water contents up to 4% or more, thereby remarkably reducing steam costs required for final latex drying, as compared to those of Comparative Examples 1 to 3.

Polymerization was performed at a variety of temperatures according to polymerization application. In this regard, water content could be decreased regardless of polymerization temperature and amounts of ascorbic acid used could be decreased in all cases by method according to the present invention.

Furthermore, in Comparative Example 4, measurement of water content was impossible due to aggregation of latex during blowing-down in a late polymerization stage, which indicates that it was impossible to obtain normal vinyl chloride resin latex when only early polymerization water was added in an amount of 50 parts by weight or less.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing a vinyl chloride resin latex comprising:
   (a) initiating polymerization of 100 parts by weight of a vinyl chloride monomer and 40 to 55 parts by weight of polymerization water; and
   (b) further adding 5 to 20 parts by weight of polymerization water in a late polymerization stage.

2. The method according to claim 1, wherein the late polymerization stage is a stage when a polymerization conversion ratio reaches 65 to 75%.

3. The method according to claim 1, wherein a weight ratio of the polymerization water of the step (a) to the polymerization water of the step (b) is 3.5:1 to 5:1.

4. The method according to claim 1, wherein, in the step (b), polymerization is continued after addition of the polymerization water.

* * * * *